United States Patent
Masuda et al.

(10) Patent No.: US 10,000,137 B2
(45) Date of Patent: Jun. 19, 2018

(54) HYBRID VEHICLE WITH MEANS FOR DISCONNECTION OF A DEPLETED AUXILIARY BATTERY IN ORDER TO ALLOW FOR MORE RAPID MAIN BATTERY CHARGING

(71) Applicant: TOYOTA JIDOSHA KABUSHIKI KAISHA, Toyota-shi, Aichi-ken (JP)

(72) Inventors: Tomokazu Masuda, Kasugai (JP); Tomohiro Inoue, Kounan (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 113 days.

(21) Appl. No.: 15/109,228

(22) PCT Filed: Dec. 3, 2014

(86) PCT No.: PCT/JP2014/006035
§ 371 (c)(1),
(2) Date: Jun. 30, 2016

(87) PCT Pub. No.: WO2015/104750
PCT Pub. Date: Jul. 16, 2015

(65) Prior Publication Data
US 2016/0325636 A1 Nov. 10, 2016

(30) Foreign Application Priority Data
Jan. 10, 2014 (JP) .................................. 2014-003131

(51) Int. Cl.
*H01M 10/46* (2006.01)
*B60L 11/18* (2006.01)

(52) U.S. Cl.
CPC ....... *B60L 11/1853* (2013.01); *B60L 11/1816* (2013.01); *B60L 11/1861* (2013.01); *B60L 11/1868* (2013.01); *B60L 2210/10* (2013.01); *Y02T 10/7005* (2013.01); *Y02T 10/7044* (2013.01); *Y02T 10/7066* (2013.01); *Y02T 10/7072* (2013.01); *Y02T 10/7216* (2013.01); *Y02T 90/127* (2013.01); *Y02T 90/14* (2013.01)

(58) Field of Classification Search
CPC ........... H02J 7/0052; H02J 7/04; H02J 7/1423
USPC ................................ 320/103, 104, 107, 138
See application file for complete search history.

(56) References Cited

U.S. PATENT DOCUMENTS

| | | | |
|---|---|---|---|
| 2012/0013182 A1* | 1/2012 | Minegishi | B60K 6/365 307/9.1 |
| 2012/0123625 A1* | 5/2012 | Ueo | B60L 3/003 701/22 |
| 2012/0187759 A1 | 7/2012 | Kamichi et al. | |

FOREIGN PATENT DOCUMENTS

| | | |
|---|---|---|
| EP | 2412588 A1 | 2/2012 |
| EP | 2535218 A1 | 12/2012 |
| JP | 2012-025297 A | 2/2012 |
| JP | 4993036 B2 | 8/2012 |
| JP | 2013-255324 A | 12/2013 |

(Continued)

Primary Examiner — Edward Tso
(74) Attorney, Agent, or Firm — Oliff PLC (57) ABSTRACT

A sub DC/DC converter converts an output voltage of a charger into a level of an output of an auxiliary battery, and outputs the output voltage to a power supply line connected to a PLG-ECU and the auxiliary battery. A control unit interrupts a current path from the power supply line to the auxiliary battery when a voltage of the sub auxiliary battery is equal to or lower than a prescribed value.

7 Claims, 7 Drawing Sheets

(56) References Cited

FOREIGN PATENT DOCUMENTS

WO     2011/016135 A1    2/2011
WO     2011/107851 A1    9/2011

\* cited by examiner

HYBRID VEHICLE WITH MEANS FOR DISCONNECTION OF A DEPLETED AUXILIARY BATTERY IN ORDER TO ALLOW FOR MORE RAPID MAIN BATTERY CHARGING

TECHNICAL FIELD

The present invention relates to vehicles, and more particularly to a vehicle charged with electric power supplied from an external power source through a charging cable.

BACKGROUND ART

WO 2011/016135 (PTL 1) discloses a technique of supplying electric power supplied from outside of a vehicle to an auxiliary battery mounted on the vehicle.

CITATION LIST

Patent Literature

[PTL 1] WO 2011/016135

SUMMARY OF INVENTION

Technical Problem

When the voltage of the auxiliary battery is low, however, the electric power supplied from outside of the vehicle may be taken by the auxiliary battery, resulting in difficulty in activating a system required to charge the vehicle.

Accordingly, an object of the present invention is to provide a vehicle in which a system required to charge the vehicle can be activated quickly even when the voltage of an auxiliary battery is low.

Solution to Problem

To solve the problem described above, the present invention provides a vehicle charged with electric power supplied from an external power source through a charging cable, including a rechargeable main power storage device and a rechargeable sub power storage device, a charger configured to convert electric power supplied from the external power source into electric power for charging the main power storage device, a charging controller that controls charging, a sub voltage converter configured to convert an output voltage of the charger into a level of an output of the sub power storage device and output the output voltage to a power supply line connected to the charging controller and the sub power storage device, and a control unit that interrupts a current path from the power supply line to the sub power storage device when a voltage of the sub power storage device is equal to or lower than a prescribed value.

Consequently, when the voltage of the sub power storage device is equal to or lower than the prescribed value, the current does not flow to the sub power storage device but flows to the charging controller, so that the charging controller can become operable.

Preferably, the vehicle further includes a relay connected between the charger and the main power storage device. The charging controller causes the relay to be turned on when the charging controller becomes operable by electric power transmitted through the power supply line.

Consequently, the main power storage device can be charged.

Preferably, the vehicle further includes a main voltage converter configured to convert an output voltage of the main power storage device into the level of the output of the sub power storage device and output the output voltage to the power supply line when an SOC of the sub power storage device is equal to or lower than a prescribed value. An output current of the main voltage converter is larger than an output current of the sub voltage converter.

Consequently, when the SOC of the sub power storage device is low, the sub power storage device can be charged quickly by using the main voltage converter.

Preferably, the control unit brings the current path into conduction when the voltage of the sub power storage device is higher than the prescribed value.

Consequently, when the voltage of the sub power storage device is higher than the prescribed value, electric power can be supplied to the charging controller as well while the sub power storage device is charged.

Preferably, the control unit operates by electric power supplied from the charger.

Consequently, even when the sub power storage device has been depleted, the control unit can be operated.

Preferably, the charging cable includes an interrupter provided on an electrical path for supplying electric power from the external power source to the vehicle, and an interruption control unit that generates a pilot signal and transmits the pilot signal to the charging controller, and controls the interrupter based on a potential of the pilot signal controlled by the charging controller. The charging controller includes a CPU that receives electric power from the sub power storage device without through the power supply line, and controls the interrupter by controlling the potential of the pilot signal based on a state of the pilot signal established by the interruption control unit, and a boost switch that can be controlled by operation of a user. The interrupter is brought into conduction by control of the potential of the pilot signal when the boost switch is turned on.

Consequently, even when the sub power storage device has been depleted, the electric power from the external power source can be taken into the vehicle through the charging cable.

Preferably, the control unit detects a voltage of a node connected to the sub power storage device, and determines whether the sub power storage device has been removed or not based on the voltage of the node.

Consequently, in the event of theft of the sub power storage device, the theft can be detected.

Advantageous Effects of Invention

According to the present invention, a system required to charge a vehicle can be activated quickly even when the voltage of an auxiliary battery is low.

DESCRIPTION OF EMBODIMENTS

Embodiments of the present invention will be described below with reference to the drawings.

First Embodiment

Figure 1:
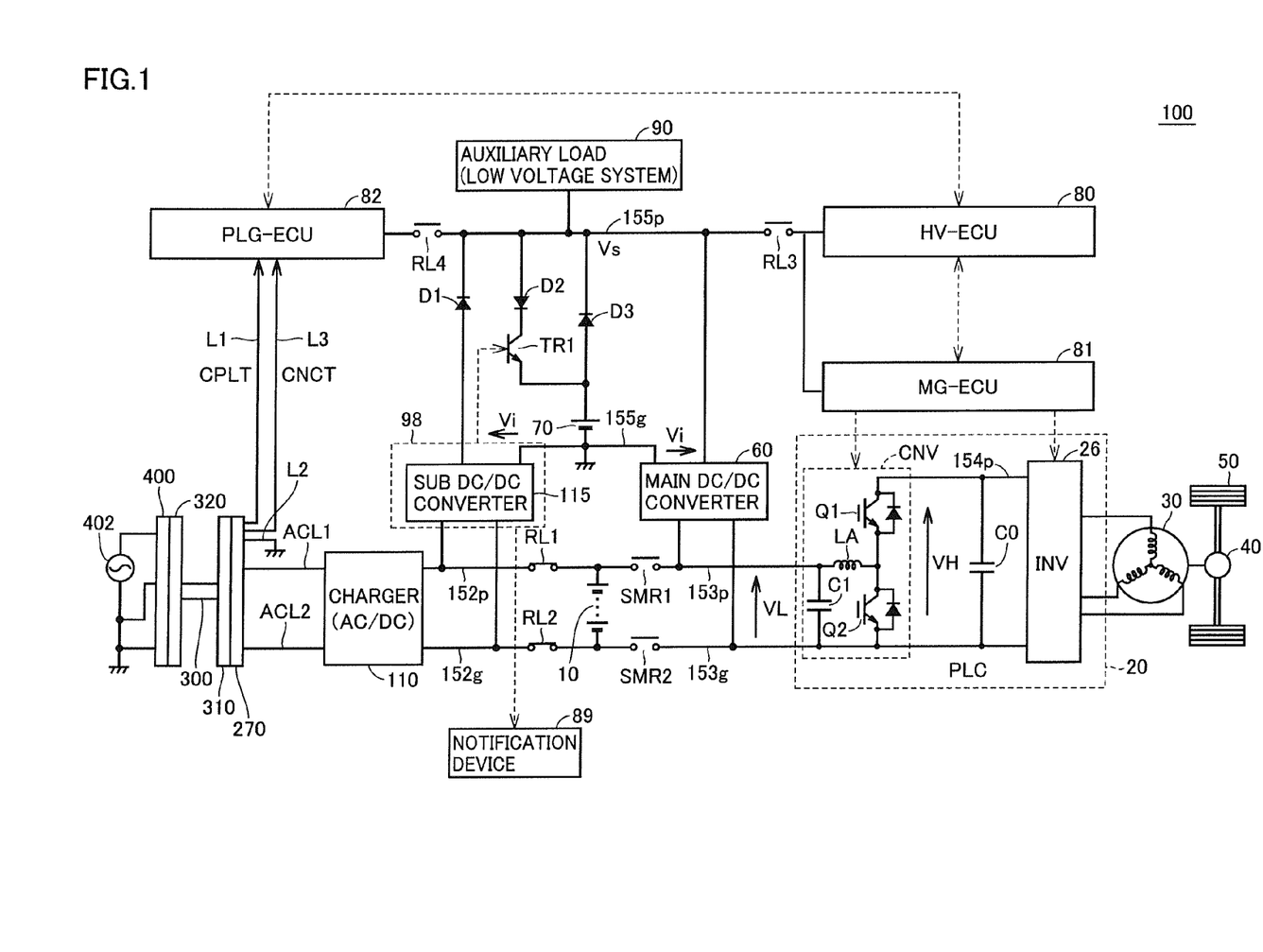
FIG. 1 is a block diagram showing the configuration of a vehicle and a charging cable.

Referring to FIG. 1, a vehicle 100 includes a main battery 10, a power control unit (PCU) 20, a motor generator 30, a power transmission gear 40, driving wheels 50, and a controller consisting of a plurality of ECUs (Electronic Control Units).

Main battery 10 is typically formed by a secondary battery such as a lithium ion battery or a nickel-metal hydride battery. By way of example, the output voltage of main battery 10 is about 200V.

PCU 20 converts electric power stored in main battery 10 into electric power for controlling driving of motor generator 30. By way of example, motor generator 30 is implemented by a permanent magnet type three-phase synchronous electric motor. PCU 20 is formed to include an inverter 26.

An output torque of motor generator 30 is transmitted through power transmission gear 40 formed by a reduction gear or a power split device to driving wheels, whereby vehicle 100 runs. At the time of regenerative braking of vehicle 100, motor generator 30 can generate electric power by the rotational force of driving wheels 50. The generated electric power is converted by PCU 20 into electric power for charging main battery 10.

Further, in a hybrid vehicle equipped with an engine (not shown) in addition to motor generator 30, coordinated operations of the engine and motor generator 30 allow generation of vehicle driving power necessary for vehicle 100. In this case, it is also possible to charge main battery 10 by using electric power generated by engine rotation. Specifically, vehicle 100 represents a vehicle equipped with an electric motor for generating power for driving the vehicle, and includes a hybrid vehicle in which the vehicle driving power is generated by an engine and an electric motor, and an electric vehicle and a fuel cell vehicle which are not equipped with an engine.

Power control unit (PCU) 20 includes a converter CNV, a smoothing capacitor C0 and inverter 26.

Converter CNV is configured to perform DC (direct-current) voltage conversion between a DC voltage VL of a power supply line 153$p$ and a DC voltage VH of a power supply line 154$p$.

Power supply line 153$p$ and a ground line 153$g$ are electrically connected to a positive electrode terminal and a negative electrode terminal of main battery 10 through system main relays SMR1 and SMR2, respectively. Smoothing capacitor C0 is connected to power supply line 154$p$ and smoothes a DC voltage. Similarly, a smoothing capacitor C1 is connected to power supply line 153$p$ and smoothes DC voltage VL.

Converter CNV is configured as a chopper circuit including power semiconductor switching elements (hereinafter also simply referred to as "switching elements") Q1 and Q2, a reactor LA and a smoothing capacitor C1, as shown in FIG. 1. Anti-parallel diodes are connected to switching elements Q1 and Q2, respectively, and therefore, converter CNV can execute bi-directional voltage conversion between power supply lines 153$p$ and 154$p$.

Inverter 26 is a general three-phase inverter and, therefore, detailed circuit structure thereof is not shown. By way of example, inverter 26 is configured such that upper and lower arm elements are arranged for each phase, and a node between the upper and lower arm elements of each phase is connected to a stator coil winding of the corresponding phase of motor generator 30.

When vehicle 100 is running (which will be hereinafter simply referred to as "at the time of vehicle running"), each switching element of inverter 26 is controlled to be turned on/off by a MG-ECU 81, whereby the DC voltage on power supply line 154$p$ is converted into a three-phase AC (alternating-current) voltage and supplied to motor generator 30. Alternatively, at the time of regenerative braking of vehicle 100, each switching element of inverter 26 is controlled to be turned on/off by MG-ECU 81 such that the AC voltage from motor generator 30 is converted into a DC voltage and output to power supply line 154$p$.

As an ECU forming the controller, FIG. 1 illustrates an HV-ECU 80 for controlling the operation of vehicle 100 at the time of vehicle running, MG-ECU 81 for controlling the operation of PCU 20, and a PLG-ECU 82 (charging controller) for controlling the external charging operation.

With regard to control of motor generator 30, HV-ECU 80 and MG-ECU 81 are hierarchically configured, in which MG-ECU 81 controls PCU 20 to drive motor generator 30 in accordance with the operation command value from HV-ECU 80.

Each ECU is formed by an electronic control unit including a CPU (Central Processing Unit) and a memory which are not shown, and configured to perform operations using values detected by various sensors, based on a map and a program stored in the memory. At least part of the ECUs may be configured to execute prescribed numerical/logical operation by hardware such as an electronic circuit. Each ECU operates when a power supply voltage of the low voltage system is supplied from a power supply line 155$p$.

Vehicle 100 further includes, as a configuration of the low voltage system (auxiliary system), a main DC/DC converter 60, an auxiliary battery 70, power supply line 155$p$, relays RL3 and RL4, and an auxiliary load 90. Auxiliary battery 70 is connected between power supply line 155$p$ and a ground line 155$g$. By way of example, auxiliary battery 70 is formed of a lead battery. The output voltage of auxiliary battery 70 corresponds to a power supply voltage Vs of the low voltage system. Rating of power supply voltage Vs is lower than the output voltage of main battery 10 and, for example, approximately 12V.

A path from auxiliary battery 70 to power supply line 155$p$ is provided with a diode D3. A path from power supply line 155$p$ to auxiliary battery 70 is provided with a diode D2 and a transistor TR1.

Main DC/DC converter 60 is configured to lower DC voltage VL corresponding to the output voltage of main battery 10 to be converted into a DC voltage of the output voltage level of auxiliary battery 70. An output rated voltage Vi of main DC/DC converter 60 is set such that auxiliary battery 70 can be charged.

Main DC/DC converter 60 is typically a switching regulator including a semiconductor switching element (not shown), and a well-known arbitrary circuit configuration may be applied thereto. The output side of main DC/DC converter 60 is connected to power supply line 155p. The input side of main DC/DC converter 60 is connected to power supply line 153p and ground line 153g.

To power supply line 155p, auxiliary load 90 of the low voltage system is connected. Auxiliary load 90 includes, for example, audio equipment, navigation equipment, and illumination devices (hazard lamp, room lamp, head lamp and the like). Each at the time of vehicle running and the time of external charging, auxiliary load 90 operates in accordance with a user operation and consumes electric power.

Relay RL3 is electrically connected between power supply line 155p and HV-ECU 80, MG-ECU 81. Relay RL4 is electrically connected between power supply line 155p and PLG-ECU 82. With regard to PLG-ECU 82, the minimum circuit elements required for external charging are configured to continuously receive electric power from auxiliary battery 70 without through relay RL4 while any circuit elements other than those are configured to receive electric power through relay RL4, with the result that the standby power is reduced.

Relay RL3 is turned on/off in response to the operation of an ignition switch. Relay RL4 is turned on while external charging is being performed, and turned off while external charging is not being performed.

Further, vehicle 100 includes, as a configuration for external charging of main battery 10, a charger 110, a vehicle inlet 270, a sub driving unit 98 including a sub DC/DC converter 115, and relays RL1 and RL2 (these being hereinafter referred to as a "charging system").

Charger 110 is connected to vehicle inlet 270 by power lines ACL1 and ACL2.

Charger 110 converts the AC voltage from an external power source 402 transmitted through power lines ACL1 and ACL2 into a DC voltage for charging main battery 10. The converted DC voltage is output across a power supply line 152p and a ground line 152g.

Vehicle inlet 270 is connected to a charging connector 310 of a charging cable 300. A plug 320 of charging cable 300 is connected to an electrical outlet 400 connected to external power source 402.

Relay RL1 is electrically connected between power supply line 152p and the positive electrode of main battery 10. Relay RL2 is electrically connected between ground line 152g and the negative electrode of main battery 10.

At the time of vehicle running, system main relays SMR1 and SMR2 are turned on, while relays RL1 and RL2 are turned off. At the time of external charging, usually, system main relays SMR1 and SMR2 are turned off, while relays RL1 and RL2 are turned on. It is noted that system main relays SMR1 and SMR2 are also turned on at the time of external charging in a second embodiment which will be described later.

Sub DC/DC converter 115 converts the DC voltage (charging voltage of main battery 10) converted by charger 110 into a DC voltage of the output voltage level of auxiliary battery 70. In other words, sub DC/DC converter 115 is equivalent in rated output voltage Vi to main DC/DC converter 60. The output of sub DC/DC converter 115 is supplied to power supply line 155p through a diode D1. As with main DC/DC converter 60, sub DC/DC converter 115 is formed of a switching regulator including a semiconductor switching element (not shown), and a well-known arbitrary circuit configuration may be applied thereto.

The output current of sub DC/DC converter 115 is limited to a minimum current (around 10 A) consumed by components that are used at the time of charging. On the other hand, the output current of main DC/DC converter 60 is set to a current (current of 100 A or more) required for components that are used at the time of running FIG. 2 is a diagram showing the configuration of charging cable 300.

Figure 2:
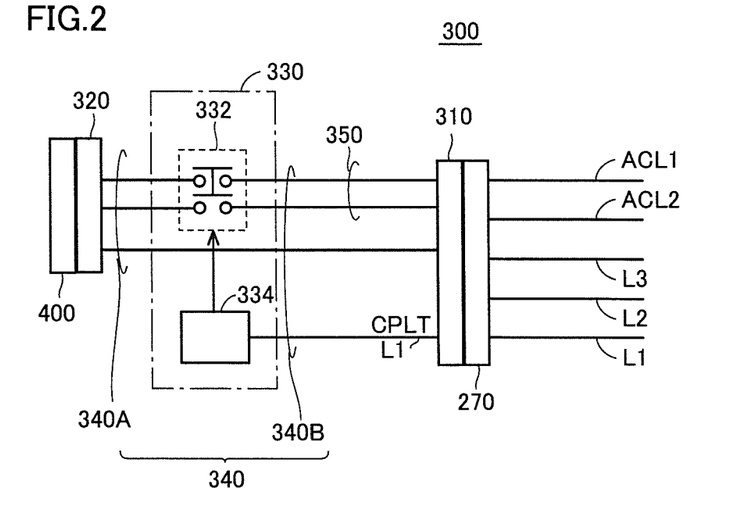
FIG. 2 is a diagram showing the configuration of the charging cable.

Referring to FIG. 2, charging cable 300 includes charging connector 310 provided on an end portion near the vehicle, a plug 320 provided on an end portion near the external power source, a charging circuit interrupt device (hereinafter also referred to as "CCID") 330, and a power line unit 340 connecting the devices to one another and inputting and outputting electric power and control signals.

Power line unit 340 includes a power line unit 340A connecting plug 320 to CCID 330, and a power line unit 340B connecting charging connector 310 to CCID 330. Power line unit 340 also includes a power line 350 for transmitting electric power from external power source 402.

Charging cable 300 is connected to electrical outlet 400 of external power source 402 (e.g., a commercial power supply) via plug 320 of charging cable 300 near the external power source. Vehicle inlet 270 provided on the body of vehicle 10 is connected to charging connector 310 of charging cable 300 near the vehicle, to transmit electric power from external power source 402 to vehicle 10.

When charging connector 310 is inserted in vehicle inlet 270 of vehicle 100, power line 350 within power line unit 340 is connected to power lines ACL1 and ACL2, charging connector 310 is connected to PLG-ECU 82 through a ground line L2 and a connection signal line L3, and a control pilot circuit 334 is connected to PLG-ECU 82 through a control pilot line L1.

Charging connector 310 detects a connection state between vehicle inlet 270 and charging connector 310, and outputs a cable connection signal CNCT indicating the connection state to PLG-ECU 82 through connection signal line L3.

CCID 330 includes a CCID relay 332 and control pilot circuit 334. CCID relay 332 is inserted in power line 350 within charging cable 300. CCID relay 332 is controlled by control pilot circuit 334. When CCID relay 332 is off, an electrical path is interrupted within charging cable 300. When CCID relay 332 is turned on, on the other hand, electric power can be supplied from external power source 402 to vehicle 10.

Control pilot circuit 334 outputs pilot signal CPLT through control pilot line L1 to PLG-ECU 82 via charging connector 310 and vehicle inlet 270. Pilot signal CPLT is to notify PLG-ECU 82 of vehicle 100 of a rated current of charging cable 300 from control pilot circuit 334. Further, PLG-ECU 82 remotely controls CCID relay 332 by controlling the voltage of pilot signal CPLT. That is, control pilot circuit 334 controls CCID relay 332 based on a variation in potential of pilot signal CPLT.

Figure 3:
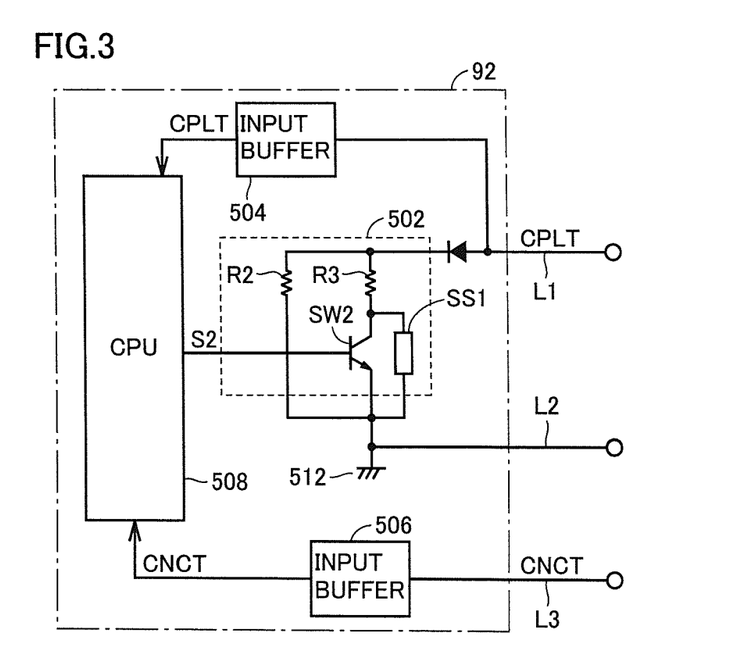
FIG. 3 is a diagram showing the configuration of a charging cable connection control unit.

FIG. 3 is a diagram showing the configuration of a charging cable connection control unit 92.

Charging cable connection control unit 92 controls the connection between charging cable 300 and vehicle 100. Charging cable connection control unit 92 is included in a control block A within PLG-ECU 82 which will be described later.

Charging cable connection control unit 92 includes a resistance circuit 502 for controlling the potential of pilot signal CPLT, input buffers 504, 506, and a CPU 508.

This configuration operates by receiving electric power directly from auxiliary battery 70 without through relay RL4. When auxiliary battery 70 is depleted, CPU 508 does not operate.

Resistance circuit 502 includes pull-down resistors R2, R3, and a switch SW2. Pull-down resistor R2 is connected between control pilot line L1 for communicating pilot signal CPLT and a vehicle ground 512. Pull-down resistor R3 and switch SW2 are also connected in series between control pilot line L1 and vehicle ground 512. Switch SW2 is controlled to be on or off in response to a control signal S2 from CPU 508.

A boost switch SS1 is provided parallel to switch SW2. Boost switch SS1 is turned on by operation of the driver. Boost switch SS1 is formed of a momentary switch, for example.

Input buffer 504 receives pilot signal CPLT on control pilot line L1, and outputs received pilot signal CPLT to CPU 508. Input buffer 506 receives cable connection signal CNCT from connection signal line L3 connected to charging connector 310, and outputs received cable connection signal CNCT to CPU 508.

The potential of cable connection signal CNCT varies by operation of connecting charging connector 310 to vehicle inlet 270. Accordingly, by detecting the potential of cable connection signal CNCT, CPU 508 can detect a connection state of charging connector 310. CPU 508 further detects a rated current of charging cable 300 by detecting an oscillation state and a duty cycle of pilot signal CPLT.

When the potential of cable connection signal CNCT indicates that vehicle inlet 270 and charging connector 310 are being connected together, and the rated current of charging cable 300 represented by pilot signal CPLT is suitable for vehicle 100, CPU 508 lowers the potential of pilot signal CPLT by causing switch SW2 to be turned on by control signal S2. Consequently, CPU 508 can remotely control CCID relay 332 such that it is turned on. Electric power is then transmitted from external power source 402 to vehicle 100 through charging cable 300.

When contacts of CCID relay 332 are closed, AC power from external power source 402 is provided to charger 110 shown in FIG. 1. Then, CPU 508 outputs a control signal to charger 110 and causes charger 100 to perform the power conversion.

(Operation During Charge Activation)

Figure 4:
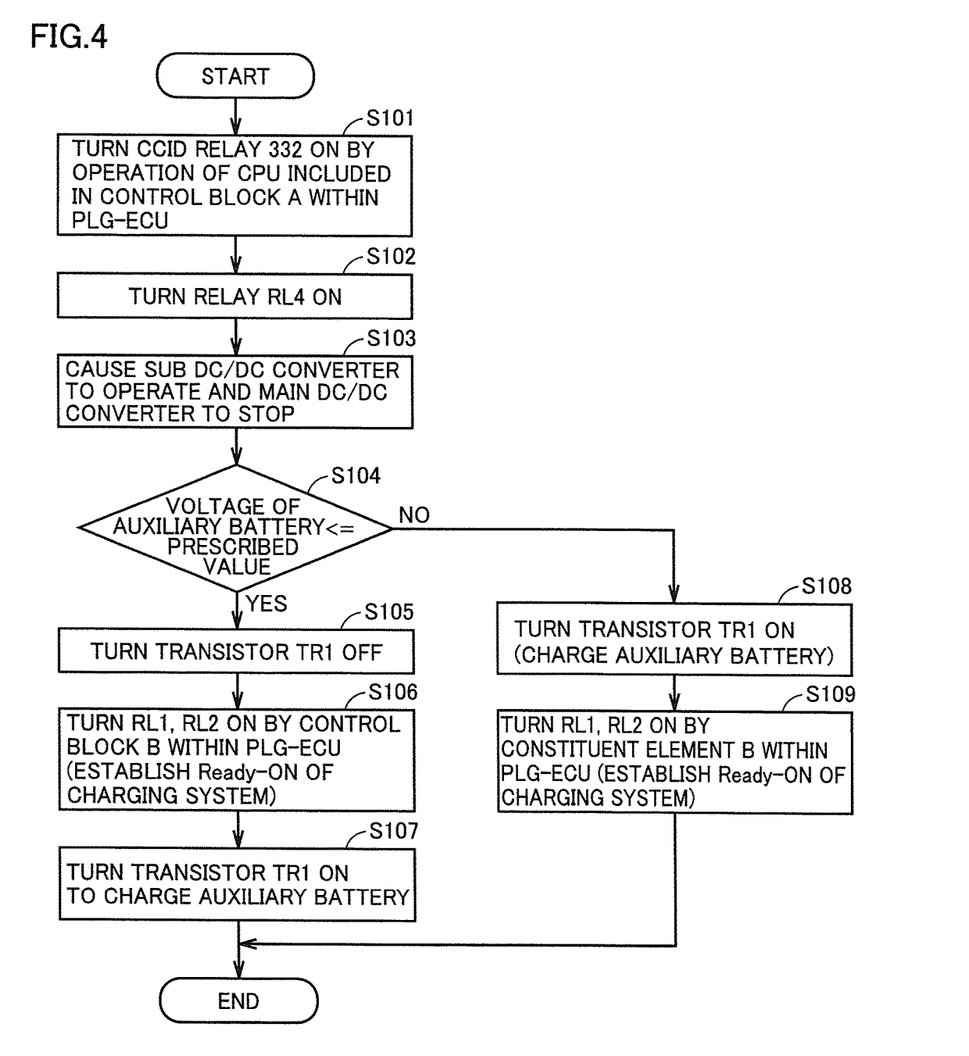
FIG. 4 is a flowchart representing a procedure of operation of activating a charging system of the vehicle by using external electric power, when an auxiliary battery has not been depleted.
Figure 5:
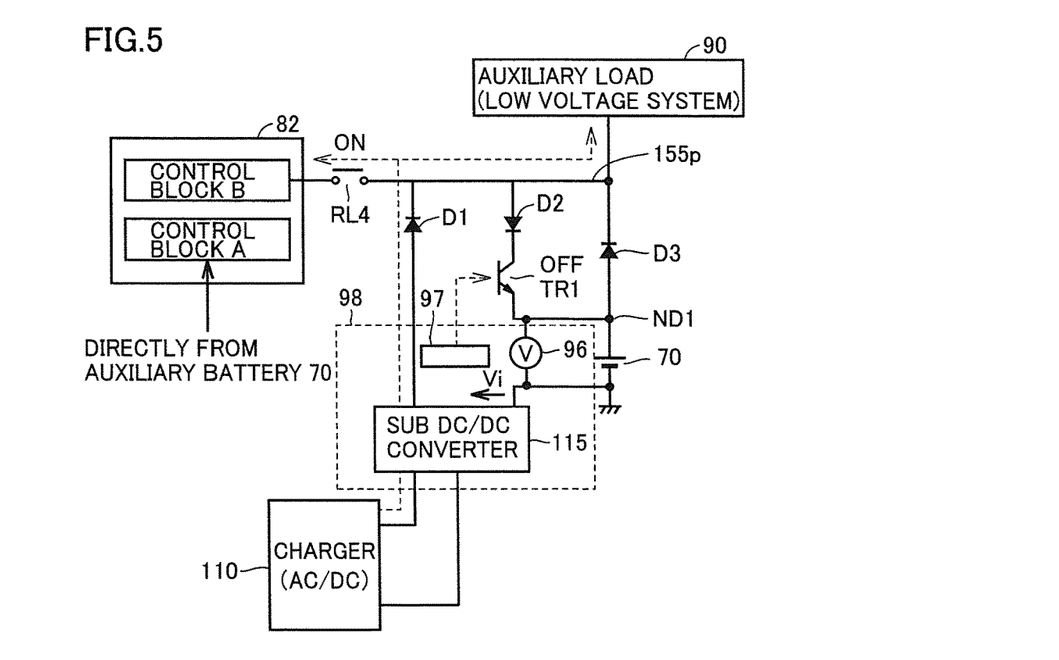
FIG. 5 is a diagram for illustrating a direction in which a current flows in the process of activating the charging system of the vehicle.
Figure 6:
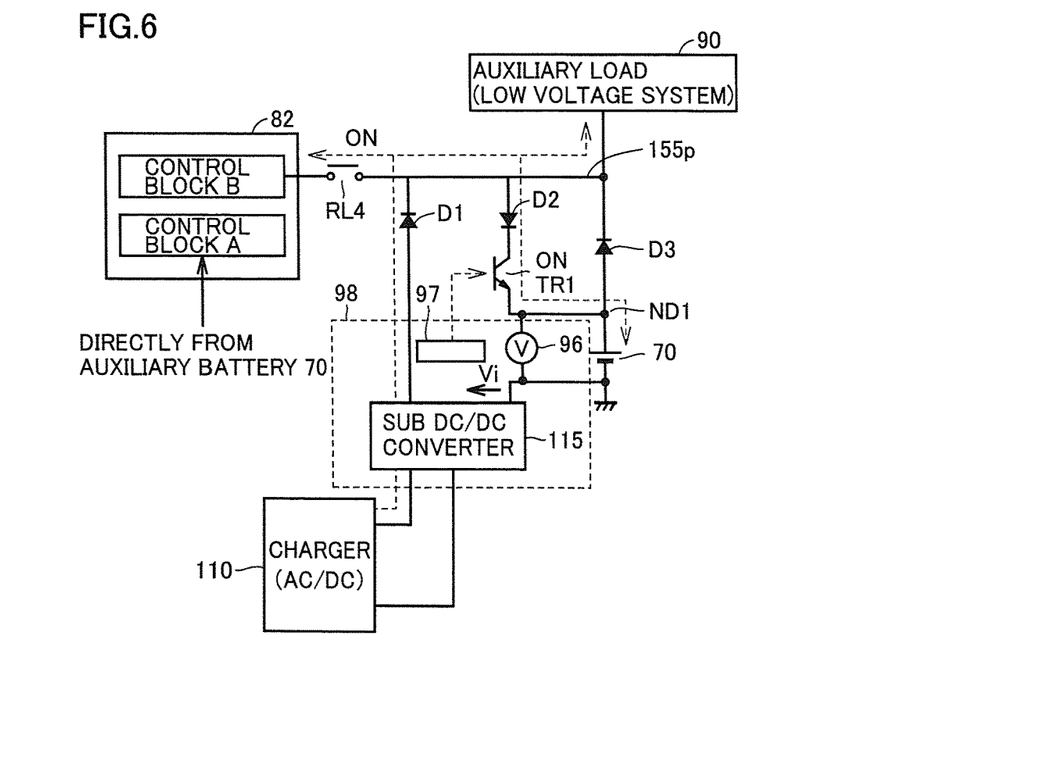
FIG. 6 is a diagram for illustrating a direction in which a current flows in the process of activating the charging system of the vehicle.

FIG. 4 is a flowchart representing a procedure of operation of activating a charging system (hereinafter referred to as charge activation) of vehicle 100 by using external electric power, when auxiliary battery 70 has not been depleted. FIGS. 5 and 6 are diagrams for illustrating a direction in which a current flows in the process of activating the charging system of vehicle 100.

Here, the activation of the charging system of vehicle 100 means that sub driving unit 98 including sub DC/DC converter 115, PLG-ECU 82 and charger 110 are operating or become operable and relays RL1, RL2 and RL4 are turned on.

As shown in FIGS. 5 and 6, PLG-ECU 82 includes control block A and a control block B. Control block A operates by receiving electric power directly from auxiliary battery 70 without through power supply line 155p and relay RL4. The configuration shown in FIG. 3 is included in control block A. Control block B operates by receiving a supply of electric power transmitted through power supply line 155p while relay RL4 is on. Accordingly, if relay RL4 is not on, control block B cannot receive the supply of electric power and does not operate.

Sub driving unit 98 includes sub DC/DC converter 115, a control unit 97, and a voltage sensor 96. Sub driving unit 98 and charger 110 operate with the electric power from external power source 402.

Referring to FIGS. 4 to 6, in step S101, if auxiliary battery 70 has not been depleted, CPU 508 included in control block A within PLG-ECU 82 operates by receiving electric power of auxiliary battery 70. When charging connector 310 is connected to vehicle inlet 270, CPU 508 causes switch SW2 to be turned on based on cable connection signal CNCT transmitted from charging connector 310 and pilot signal CPLT transmitted from control pilot circuit 334. Consequently, the potential of pilot signal CPLT is lowered, CCID relay 332 is turned on, and the electric power is transmitted from external power source 402 to charger 110.

In step S102, control unit 97 included in sub driving unit 98 further causes relay RL4 to be turned on. Consequently, PLG-ECU 82 is connected to power supply line 155p.

In step S103, control unit 97 included in sub driving unit 98 causes sub DC/DC converter 115 to operate and main DC/DC converter 60 to stop. That is, in main DC/DC converter 60, the switching element is kept turned off, and therefore, power loss associated with power conversion is not incurred.

In step S104, voltage sensor 96 included in sub driving unit 98 detects a voltage of auxiliary battery 70. If the voltage of auxiliary battery 70 is equal to or lower than a prescribed value, the process proceeds to step S105, while if the voltage of auxiliary battery 70 is higher than the prescribed value, the process proceeds to step S108.

In step S105, control unit 97 included in sub driving unit 98 causes transistor TR1 to be turned off. Consequently, as shown in FIG. 5, the current output from sub DC/DC converter 115 to power supply line 155p is output to auxiliary load 90 and control block B of PLG-ECU 82, but does not flow to auxiliary battery 70. As a result, the current output to power supply line 155p is not taken by auxiliary battery 70 of low voltage, so that the electric power can be supplied to control block B of PLG-ECU 82. Here, if the voltage of auxiliary battery 70 is higher than the voltage of power supply line 155p, the current also flows from auxiliary battery 70 to power supply line 155p.

In step S106, control block B within PLG-ECU 82 that has received the supply of electric power causes relays RL1 and RL2 to be turned on to establish an activated state (Ready-ON state) of the charging system of vehicle 100. Consequently, main battery 10 is charged with the DC voltage from charger 110.

In step S107, control unit 97 included in sub driving unit 98 causes transistor TR1 to be turned on. Consequently, as shown in FIG. 6, the current output from sub DC/DC converter 115 to power supply line 155p is output to auxiliary load 90 and PLG-ECU 82, and flows to auxiliary battery 70. The current flow through auxiliary battery 70 can prevent depletion of auxiliary battery 70. In this state, since the activated state of the charging system of vehicle 100 has already been established, it will not be problematic if the current output to power supply line 155p is taken by auxiliary battery 70 of low voltage.

In step S108, control unit 97 included in sub driving unit 98 causes transistor TR1 to be turned on. Consequently, as shown in FIG. 6, the current output from sub DC/DC converter 115 to power supply line 155p is output to auxiliary load 90 and PLG-ECU 82, and flows to auxiliary battery 70. Since the voltage of auxiliary battery 70 is higher (high voltage) than the prescribed value, the current output to power supply line 155p flows to PLG-ECU 82 as well without preferentially flowing to auxiliary battery 70. As a result, the electric power can be supplied to control block B of PLG-ECU 82, so that external charging process can be performed and auxiliary battery 70 is charged.

In step S109, control block B within PLG-ECU 82 causes relays RL1 and RL2 to be turned on to establish the activated state (Ready-ON state) of the charging system of vehicle 100. Main buttery 10 is charged, through relays RL1 and RL2 in an on state, with the DC voltage obtained by the conversion of the AC power from external power source 402 by charger 110.

(Theft Detection)

Auxiliary battery 70 is mounted in a position where it can be readily removed so as to facilitate replacement of the battery. Further, auxiliary battery 70 is lightweight and small in size, and is therefore vulnerable to theft. For this reason, vehicle 100 according to this embodiment has a function of notifying the driver whether auxiliary battery 70 has been removed or not.

Figure 7:
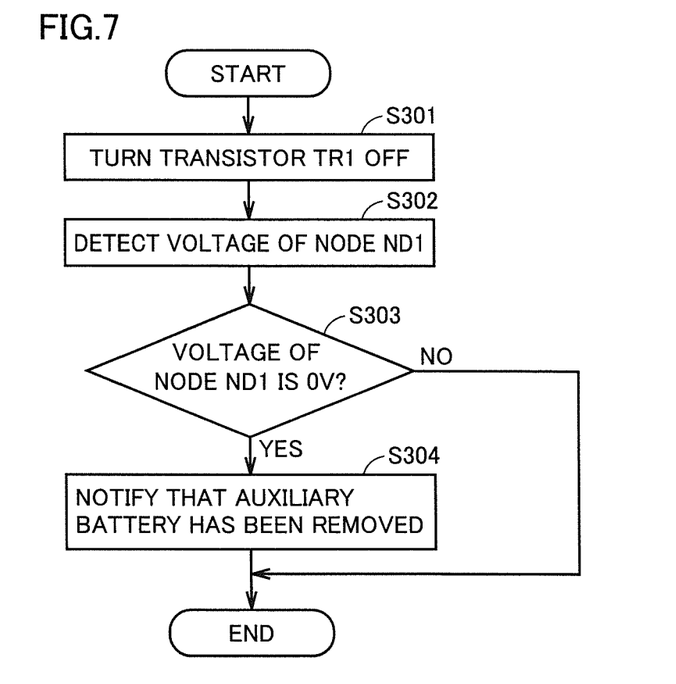
FIG. 7 is a flowchart representing a procedure of determining whether the auxiliary battery has been removed or not.

FIG. 7 is a flowchart representing a procedure of determining whether auxiliary battery 70 has been removed or not.

This procedure is carried out when, for example, charging cable 300 is being connected to vehicle 100 and vehicle 100 is not being charged.

In step S301, control unit 97 included in sub driving unit 98 causes transistor TR1 to be turned off.

In step S302, voltage sensor 96 included in sub driving unit 98 detects a voltage of a node ND1 connected to auxiliary battery 70. If auxiliary battery 70 has been removed by theft, the voltage detected by voltage sensor 96 is "0V" (ground voltage). If auxiliary battery 70 has not been removed, the voltage detected by voltage sensor 96 is the voltage of auxiliary battery 70. Here, while the voltage detected by voltage sensor 96 is the voltage of auxiliary battery 70 because transistor TR1 has been turned off, the voltage detected by voltage sensor 96 may not be the voltage of auxiliary battery 70 if transistor TR1 has been turned on.

In step S303, if the detected voltage is "0V," the process proceeds to step S304.

In step S304, control unit 97 included in sub driving unit 98 determines that auxiliary battery 70 has been removed by theft, and notifies the driver that auxiliary battery 70 has been removed through a notification device 89 consisting of a liquid crystal display and the like.

As described above, in this embodiment, if the voltage of the auxiliary battery is equal to or lower than the prescribed value, the current path from the sub DC/DC converter to the auxiliary battery is interrupted, thereby avoiding the difficulty in activating the system required to charge the vehicle due to the taking of the electric power from the external power source to the auxiliary battery.

It is noted that during a time period other than the charging in steps S107 and S108 in FIG. 4, such as a standby period before the charging with a timer, and before charging cable 300 is disconnected from vehicle 100 after completion of the charging, auxiliary battery 70 may be charged by causing transistor TR1 to be turned on. Since the electric power of auxiliary battery 70 is used, other than for the charging, for detection of the opening/closing of a door, key authentication, and adjustment of temperature of main battery 10, depletion of auxiliary battery 70 can be prevented. The adjustment of temperature of main battery 10 is made so as to prevent deterioration of main battery 10, and to prevent reduction in starting capability when the driver gets in the vehicle.

Second Embodiment

Figure 8:
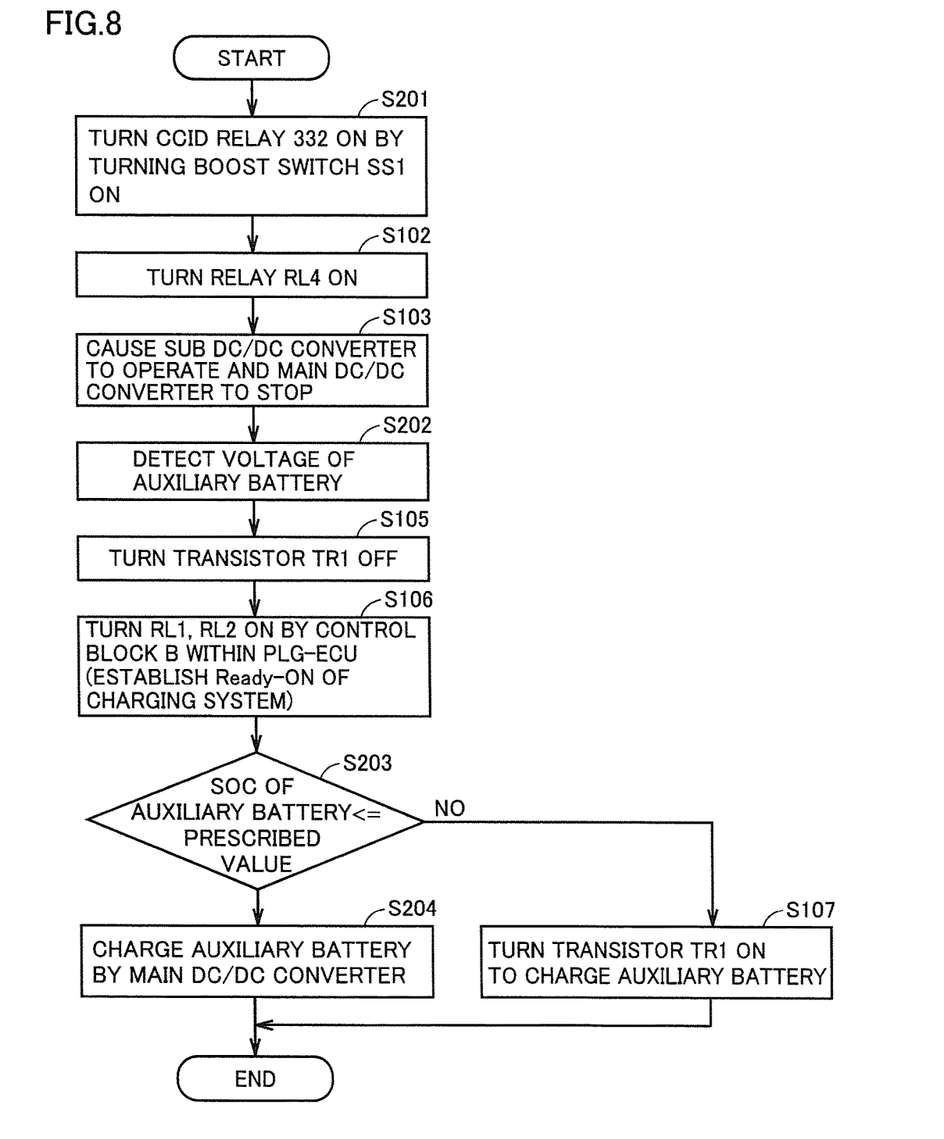
FIG. 8 is a flowchart representing a procedure of operation of activating the charging system of the vehicle by using external electric power, when the auxiliary battery has been depleted.
Figure 9:
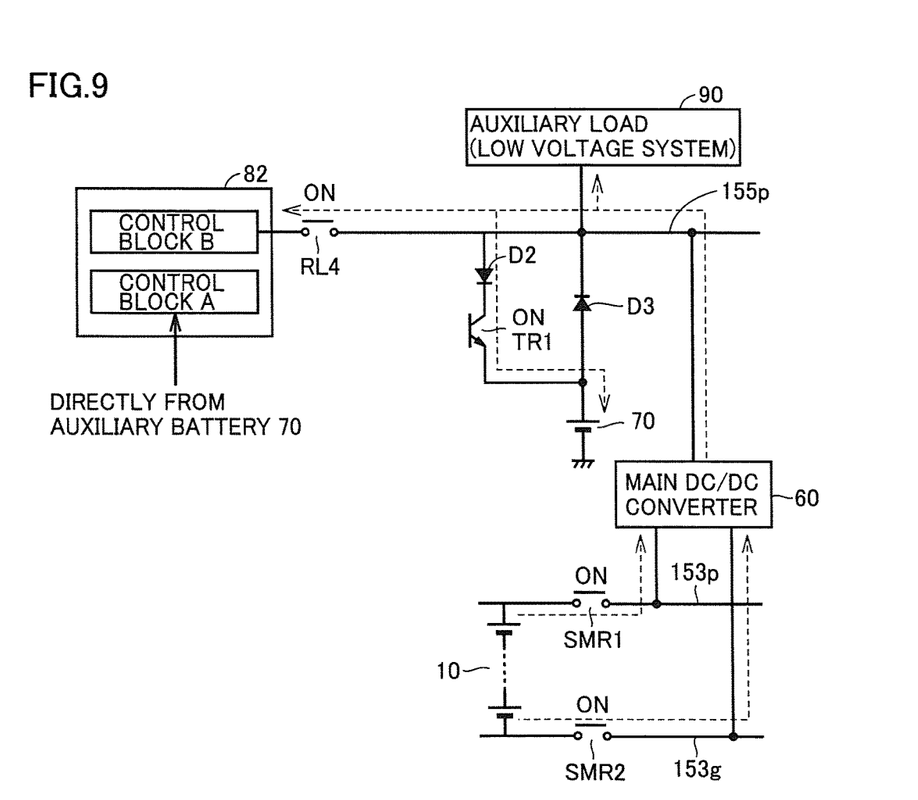
FIG. 9 is a diagram for illustrating a direction in which a current flows while the auxiliary battery is charged.

FIG. 8 is a flowchart representing a procedure of operation of activating the charging system (hereinafter referred to as charge activation) of vehicle 100 by using external electric power, when auxiliary battery 70 has been depleted. FIG. 9 is a diagram for illustrating a direction in which a current flows while auxiliary battery 70 is charged.

In step S201, if auxiliary battery 70 has been depleted, CPU 508 within PLG-ECU 82 does not operate. Instead, boost switch SS1 provided parallel to switch SW2 is turned on by the driver. Consequently, the potential of pilot signal CPLT is lowered and CCID relay 332 is turned on, in a manner similar to when switch SW2 is turned on in step S101 in FIG. 4 of the first embodiment.

In step S102, in a manner similar to the first embodiment, control unit 97 within sub driving unit 98 further causes relay RL4 to be turned on. Consequently, PLG-ECU 82 is connected to power supply line 155p.

In step S103, in a manner similar to the first embodiment, control unit 97 within sub driving unit 98 causes sub DC/DC converter 115 to operate and main DC/DC converter 60 to stop.

In step S202, voltage sensor 96 included in sub driving unit 98 detects a voltage of auxiliary battery 70. The voltage of auxiliary battery 70 is equal to or lower than the prescribed value, and the process proceeds to step S105.

In step S105, in a manner similar to the first embodiment, control unit 97 included in sub driving unit 98 causes transistor TR1 to be turned off. Consequently, as shown in FIG. 5, the current output from sub DC/DC converter 115 to power supply line 155p is output to auxiliary load 90 and PLG-ECU 82, but does not flow to auxiliary battery 70. As a result, the current output to power supply line 155p is not taken by auxiliary battery 70 of low voltage, so that the electric power can be supplied to the entire PLG-ECU 82 and external charging process can be performed.

In step S106, control block B within PLG-ECU 82 causes relays RL1 and RL2 to be turned on to establish an activated state (Ready-ON state) of the charging system of vehicle 100. Consequently, main battery 10 is charged with the DC voltage from charger 110.

In step S203, control block B within PLG-ECU 82 determines whether an SOC (State of Charge) of auxiliary battery 70 is equal to or lower than a prescribed value or not. For example, control block B estimates the SOC of auxiliary battery 70 based on the voltage of auxiliary battery 70. If the SOC of auxiliary battery 70 is equal to or lower than the prescribed value, the process proceeds to step S204, while the SOC of auxiliary battery 70 is higher than the prescribed value, the process proceeds to step S205.

In step S204, control block B within PLG-ECU 82 causes system main relays SMR1 and SMR2 to be turned on, causes sub DC/DC converter 115 to stop and main DC/DC converter 60 to operate, and causes transistor TR1 to be turned on. This is done because, when the SOC of auxiliary battery 70 is low, such as when auxiliary battery 70 has been depleted, it is more efficient to charge auxiliary battery 70 with a large current (100 A or more) output from main DC/DC converter 60 rather than to charge auxiliary battery 70 with a small current (around 10 A) output from sub DC/DC converter 115.

Consequently, as shown in FIG. 9, the current output from main DC/DC converter 60 to power supply line 155p flows to auxiliary load 90, PLG-ECU 82 and auxiliary battery 70. Auxiliary battery 70 is thus charged.

In step S107, control unit 97 included in sub driving unit 98 causes transistor TR1 to be turned on. Consequently, the current output from sub DC/DC converter 115 to power supply line 155p is output to auxiliary load 90 and PLG-ECU 82, and flows to auxiliary battery 70. This is done because, when the SOC of auxiliary battery 70 is high, it is not inefficient to charge auxiliary battery 70 with the small current (around 10 A) output from sub DC/DC converter 115.

As described above, according to this embodiment, when the auxiliary battery has been depleted, electrical connection between the vehicle and the charging cable can be completed by operation of the booster switch.

It is planned to combine together the embodiments disclosed herein as appropriate. It should be understood that the embodiments disclosed herein are illustrative and non-restrictive in every respect. The scope of the present invention is defined by the terms of the claims, rather than the description of the embodiments above, and is intended to include any modifications within the scope and meaning equivalent to the terms of the claims.

REFERENCE SIGNS LIST 10 main battery; 20 PCU; 26 inverter; 30 motor generator; 40 power transmission gear; 50 driving wheel; 60 main DC/DC converter; 70 auxiliary battery; 80 HV-ECU; 81 MG-ECU; 82 PLG-ECU; 90 auxiliary load; 92 charging cable connection control unit; 96 voltage sensor; 97 control unit; 98 sub driving unit; 100 vehicle; 110 charger; 115 sub DC/DC converter; 152g, 153g, 155g ground line; 152p, 153p, 154p, 155p power supply line; 270 vehicle inlet; 300 charging cable; 310 charging connector; 320 plug; 330 CCID; 332 CCID relay; 334 control pilot circuit; 340 power line unit; 350 power line; 400 electrical outlet; 402 external power source; 502 resistance circuit; 504, 506 input buffer; 508 CPU; 512 vehicle ground; C0, C1 smoothing capacitor; CNV converter; LA reactor; Q1, Q2 power semiconductor switching element; RL1, RL2, RL3, RL4, SMR1, SMR2 relay; D1, D2, D3 diode; TR1 transistor; R2, R3 resistor; SW2 switch; SS1 boost switch.

The invention claimed is:

1. A vehicle charged with electric power supplied from an external power source through a charging cable, comprising:
a rechargeable main power storage device and a rechargeable sub power storage device;
a charger configured to convert electric power supplied from said external power source into electric power for charging said main power storage device;
a charging controller that controls charging, said charging controller including a first control block that controls a relay on a current path between said charger and said main power storage device, and a second control block that controls transmission of electric power from said charging cable to said charger;
a sub voltage converter configured to convert an output voltage of said charger into a level of an output of said sub power storage device and output the output voltage to a power supply line connected to said first control block of said charging controller and said sub power storage device; and
a control unit that interrupts a current path from said power supply line to said sub power storage device when a voltage of said sub power storage device is equal to or lower than a prescribed value,
said second control block receiving electric power from said sub power storage device.

2. The vehicle according to claim 1, further comprising the relay connected between said charger and said main power storage device, wherein
said charging controller causes said relay to be turned on when said charging controller becomes operable by electric power transmitted through said power supply line.

3. The vehicle according to claim 2, further comprising a main voltage converter configured to convert an output voltage of said main power storage device into the level of the output of said sub power storage device and output the output voltage to said power supply line when an SOC of said sub power storage device is equal to or lower than a prescribed value, wherein
an output current of said main voltage converter is larger than an output current of said sub voltage converter.

4. The vehicle according to claim 1, wherein
said control unit brings said current path into conduction when the voltage of said sub power storage device is higher than said prescribed value.

5. The vehicle according to claim 1, wherein
said control unit operates by electric power supplied from said charger.

6. The vehicle according to claim 5, wherein
said charging cable includes
an interrupter provided on an electrical path for supplying electric power from said external power source to said vehicle, and
an interruption control unit that generates a pilot signal and transmits said pilot signal to said charging controller, and controls said interrupter based on a potential of said pilot signal controlled by said charging controller, and
said charging controller includes
a CPU that receives electric power from said sub power storage device, and controls said interrupter by controlling the potential of said pilot signal based on a state of said pilot signal established by said interruption control unit, and
a boost switch that can be controlled by operation of a user, in which said interrupter is brought into conduction by control of the potential of said pilot signal when said boost switch is turned on.

7. The vehicle according to claim 5, wherein
said control unit detects a voltage of a node connected to said sub power storage device, and determines whether said sub power storage device has been removed or not based on the voltage of said node.

* * * * *